(12) United States Patent
Rucks

(10) Patent No.: US 7,240,636 B2
(45) Date of Patent: Jul. 10, 2007

(54) JETTER CUP HOLDER

(76) Inventor: Chad Rucks, 22420 NW. 144th Ave., Okeechobee, FL (US) 34972

( * ) Notice: Subject to any disclaimer, the term of this patent is extended or adjusted under 35 U.S.C. 154(b) by 274 days.

(21) Appl. No.: 11/023,396

(22) Filed: Dec. 29, 2004

(65) Prior Publication Data

US 2006/0137616 A1    Jun. 29, 2006

(51) Int. Cl.
*A01J 5/04* (2006.01)
(52) U.S. Cl. .................................. 119/14.49
(58) Field of Classification Search ............. 119/14.05, 119/14.14, 14.18, 14.45–14.48, 14.1; 47/71, 47/44, 46, 47, 65.6, 80, 39, 40.5; 220/630; 248/346.11, 129; D7/624.1; D11/164
See application file for complete search history.

(56) References Cited

U.S. PATENT DOCUMENTS

| | | | |
|---|---|---|---|
| 2,231,300 A * | 2/1941 | Shockney ...................... 47/80 |
| 2,956,571 A | 10/1960 | Heisler |
| 3,012,566 A | 12/1961 | Baker |
| 3,629,005 A | 12/1971 | Belden |
| 3,696,790 A | 10/1972 | Albright |
| 3,726,253 A | 4/1973 | Duncan |
| 3,834,407 A | 9/1974 | Heitman |
| 4,516,592 A * | 5/1985 | Schultz et al. .......... 134/169 C |
| 5,345,712 A * | 9/1994 | Lambert ........................ 47/39 |
| 5,819,469 A * | 10/1998 | Hsu .............................. 47/39 |
| 6,385,899 B1 * | 5/2002 | Treganza ....................... 47/39 |
| 6,401,654 B1 | 6/2002 | Hallsten et al. |
| 6,418,877 B1 | 7/2002 | Fredericks et al. |
| 6,431,116 B1 * | 8/2002 | Nilsson ................... 119/14.08 |
| D488,089 S * | 4/2004 | Sellers ....................... D11/164 |
| 6,983,921 B1 * | 1/2006 | Rahmer ...................... 248/523 |
| 7,114,288 B1 * | 10/2006 | Kershaw ........................ 47/39 |

* cited by examiner

*Primary Examiner*—Thomas Price
(74) *Attorney, Agent, or Firm*—Emerging Strategies, PLLC; William A. Bonk, III

(57) ABSTRACT

Apparatus for holding a jetter cup having an opening, includes a peg having a first portion, a second portion and a third portion interposed between and larger than the first portion and the second portion, wherein the third portion is larger than the opening of the jetter cup.

12 Claims, 3 Drawing Sheets

JETTER CUP HOLDER

BACKGROUND OF THE INVENTION

Most commercial dairy farms use automatic milking equipment to milk cows, goats or other dairy animals. Such milking equipment typically includes a plurality of milking cups connected to a milking claw. The milking claw is connected to a milk collection receptacle via conventional flexible tubing.

The milking cups typically include a rubber liner received within a shell. Milking cup liners have various configurations, but commonly include an enlarged mouthpiece extending around the top of the shell, a liner barrel within the shell, and a short milk tube that extends from the bottom of the shell to the milking claw.

Automatic milking equipment typically cycles the pressure between the liner and the shell between negative and atmospheric pressure. The alternating pressure cycles cause the walls of the liner to massage and milk the teats of the udder. Continuous vacuum applied to the interior of the rubber liner moves the milk from the teats into the liner, then to the claw and to the milk collection receptacle.

Clean liners are essential for sanitation and to prevent infection of the animals of the herd. Commercial dairy farms typically employ a great number of milking cups and liners, thus must rely on automatic cleaning equipment for sanitizing. Automatic cleaning equipment typically includes a plurality of jetter cups for receiving and cleansing the milking cups. A jetter cup is a rubber cup into which the enlarged end portion of a milking cup is received. This avoids deformation of the mouth piece of the liner and allows circulation of cleaning solution around the outside of the liner for complete cleaning.

During milking, the jetter cups must be hung or stored out of the way for their protection and cleanliness, and to avoid cluttering the space. However, typical jetter cup storage units are difficult to use and easily damaged.

Some storage apparatuses employ wireform support members. To adequately insure cleanliness, the fit between an enveloping hood and the wires must be quite tight, which causes binding when the jetter-cups are slid into place. This often leads to improper storing of the jetter-cups, thus defeating the purpose of the protective hood. See, e.g., U.S. Pat. No. 2,956,571. Other storage apparatuses provide holders having annular walls that define inverted truncated cones, but require negative pressure to retain the jetter cups thereon. See, e.g., U.S. Pat. No. 4,516,592. Still other storage apparatuses include unprotected racks with grippers. See, e.g., U.S. Pat. No. 6,431,116, issued Aug. 13, 2002, to M. Nilsson for Apparatus for Performing Animal Related Operations.

What is needed, and not taught or suggested in the art, is a jetter cup holder that retains a jetter cup without reliance on vacuum and prevents contamination.

SUMMARY OF THE INVENTION

The invention overcomes the disadvantages noted above by providing a jetter cup holder that retains a jetter cup without reliance on vacuum and prevents contamination. To that end, an embodiment configured according to principles of the invention for an apparatus includes a peg having a first portion, a second portion and a third portion interposed between and larger than the first portion and the second portion, wherein the third portion is larger than the opening of the jetter cup.

The invention provides improved elements and arrangements thereof, for the purposes described, which are inexpensive, dependable and effective in accomplishing intended purposes of the invention.

Other features and advantages of the invention will become apparent from the following description of the preferred embodiments, which refers to the accompanying drawings.

BRIEF DESCRIPTION OF THE DRAWINGS

The invention is described in detail below with reference to the following figures, throughout which similar reference characters denote corresponding features consistently, wherein.

DETAILED DESCRIPTION OF THE PREFERRED EMBODIMENTS

Figure 1:
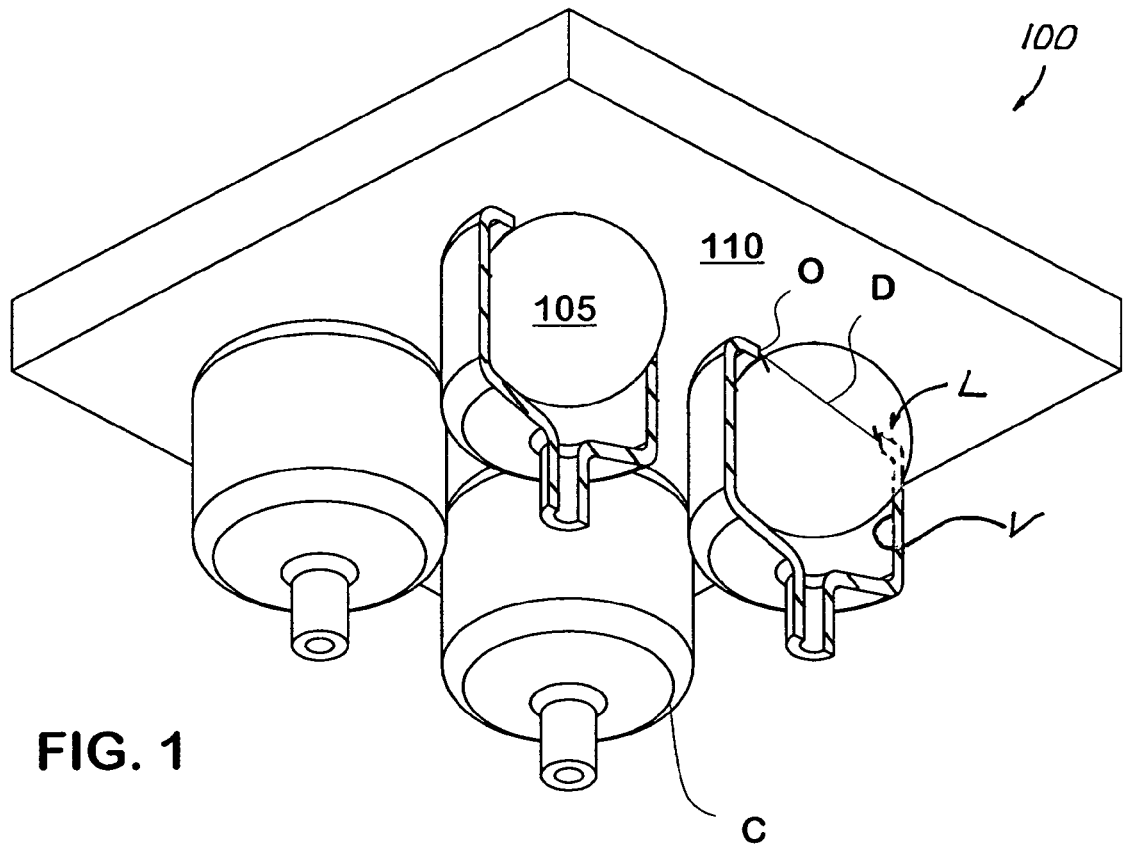
FIG. 1 is an environmental perspective view of an embodiment of a jetter cup holder configured according to principles of the invention, jetter cups shown connected thereto being for illustrative purposes only and forming no portion of the invention.
Figure 2:
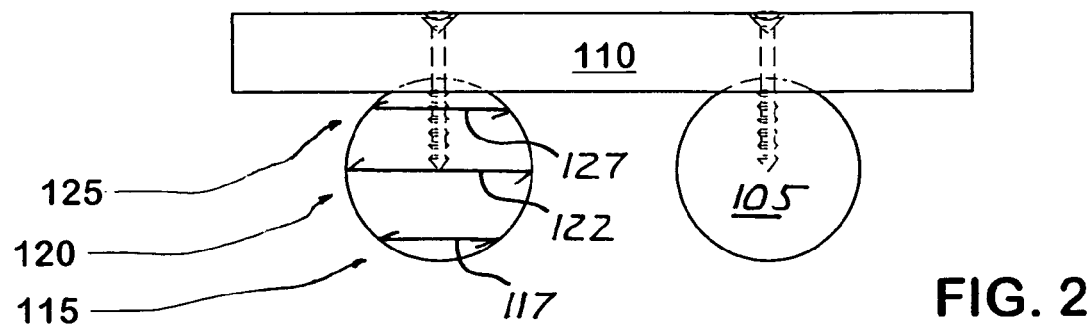
FIG. 2 is a front elevational of the embodiment of FIG. 1.

Referring to FIGS. 1 and 2, an embodiment configured according to principles of the invention is a jetter cup holder 100 that retains a jetter cup C without reliance on vacuum and prevents contamination. Jetter cup holder 100 includes a plurality of pegs 105, each configured to received a jetter cup C, mounted on a plate 110.

Each jetter cup C generally describes an open-ended volume V configured to receive the enlarged end portion of a milking cup (not shown) and having an inwardly disposed lip L. Lip L defines an opening O having a diameter D sized and configured to stretch for receiving the milking cup (not shown), then form an interference fit with the milking cup (not shown) once received. Once the milking cup (not shown) is cleaned, the milking cup (not shown) is removed from jetter cup C and jetter cup C is stored on jetter cup holder 100, as shown in FIG. 1.

Accordingly, referring to FIG. 2, peg 105 of jetter cup holder 100 is configured to receive and maintain jetter cup C. Peg 105 may assume any shape suited to the purposes of the invention, but preferably is spherical. A spherical shape is preferred because such allows for removing a jetter cup C generally from any direction without creating elevated strains, or strains in unanticipated directions, that may cause material failures in peg 105, plate 110 or a bracket (not shown) holding same. The spherical shape also presents an easy surface for cleaning.

Regardless of shape, peg 105 has a lower portion 115 sized so as not to interfere with opening O, that is, the dimension 117 does not exceed diameter D. Peg 105 has a central portion 120 sized so as to interfere with opening O, that is, the dimension 122 does not exceed diameter D. Thus, jetter cup C easily may be positioned on peg 105, then, with sufficient, but not inordinate, force, urged past central portion 120. The relatively oversized relationship of central portion 120 to opening O of jetter cup C provides for retaining jetter cup C on peg 105.

Preferably, peg 105 also has an upper portion 125 sized so as not to interfere with opening O, that is, the dimension 127 does not exceed diameter D. This facilitates securing a jetter cup C to a peg 105 and ensures retention thereon. Once sufficiently beyond central portion 120, stretched elastic lip L has a tendency to constrict and urge jetter cup C toward a portion of peg having a relatively smaller dimension, such as provided by upper portion 125. Thus, peg 105 does not require a vacuum, but relies on an "over-center" and/or interference fit phenomena to retain a jetter cup C.

Preferably, peg 105 is configured so that, when jetter cup C is mounted thereon, peg 105 and jetter cup C define a continuous, sealed surface, which prevents ordinary contamination from entering jetter cup C when stored on jetter cup holder 100.

In practice, a plurality of pegs 105 are mounted on plate 110 with threaded fasteners, such as stainless steel screws. Pegs 105 and plate 110 may be connected in other fashions appropriate to the purposes of the invention, or molded integrally.

Plate 110 should be mounted to an external structure, such as a milking barn post, in a manner that promotes runoff running along plate 110, rather than along pegs 105, so as to discourage contaminated fluid from seeping into jetter cups C when stored and cleaned.

Figure 3:
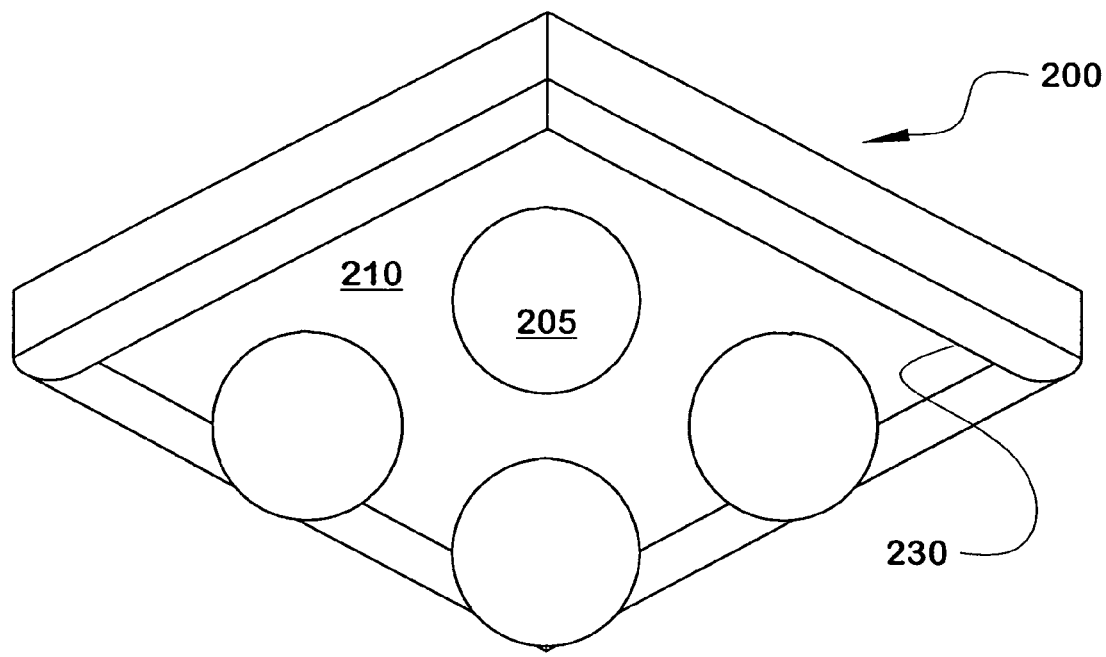
FIGS. 3 and 4 respectively are environmental perspective and front elevational views of another embodiment of a jetter cup holder configured according to principles of the invention.
Figure 4:
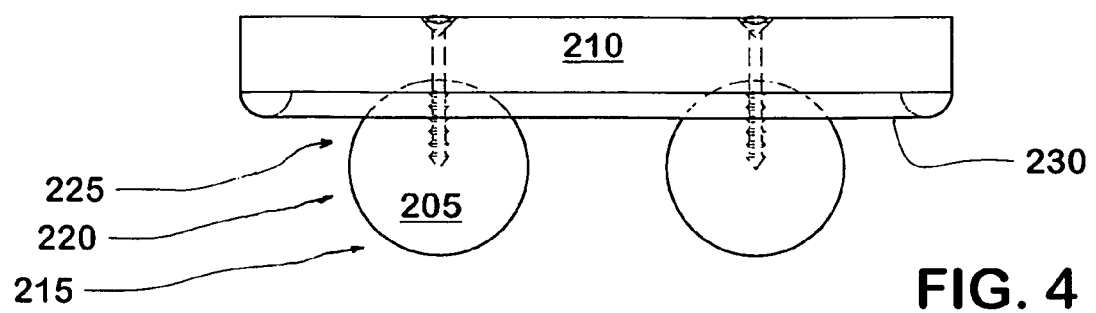

Referring to FIGS. 3 and 4, another embodiment configured according to principles of the invention is a jetter cup holder 200 that includes a plurality of pegs 205, each configured to receive a jetter cup (not shown), mounted on a plate 210. As with peg 105, peg 205 has a similar lower portion 215, central portion 220 and upper portion 225.

Jetter cup holder 200 includes a bead 230, which forms a natural collection point for fluid to drip off of plate 210, rather than running back to peg 205 and seeping into jetter cups C when stored and cleaned. Bead 230 may have rounded corners and/or may extend farther from plate 210 to better protect jetter cups (not shown) mounted on pegs 205 from contaminating fluid.

Figure 5:
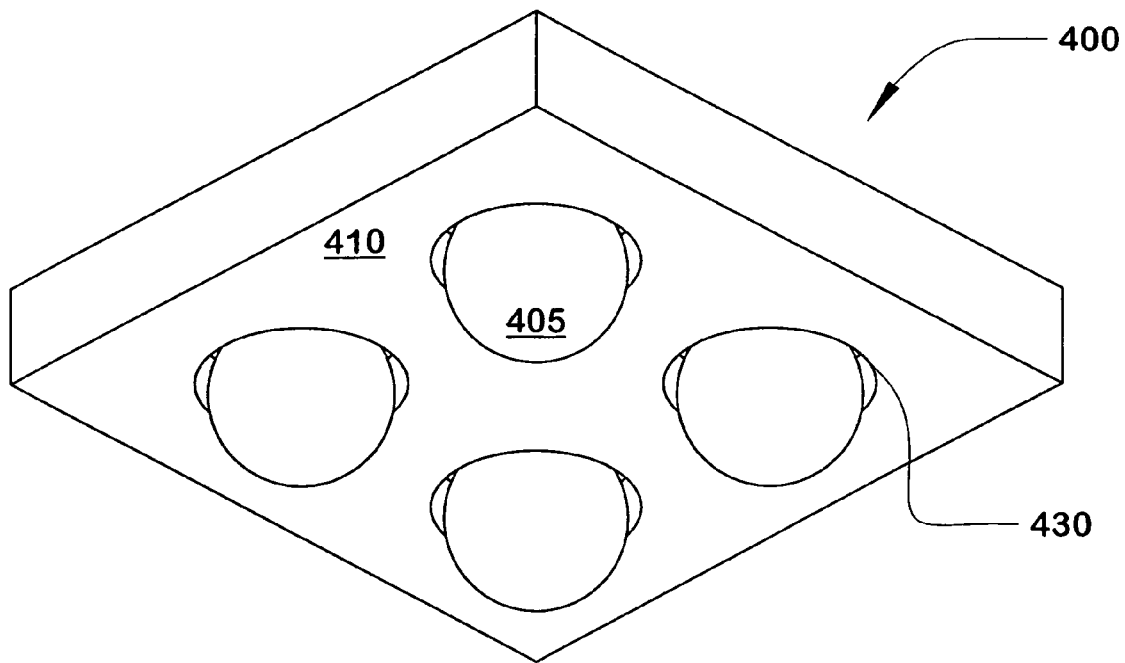
FIGS. 5 and 6 respectively are environmental perspective and front elevational views of a further embodiment of a jetter cup holder configured according to principles of the invention.
Figure 6:
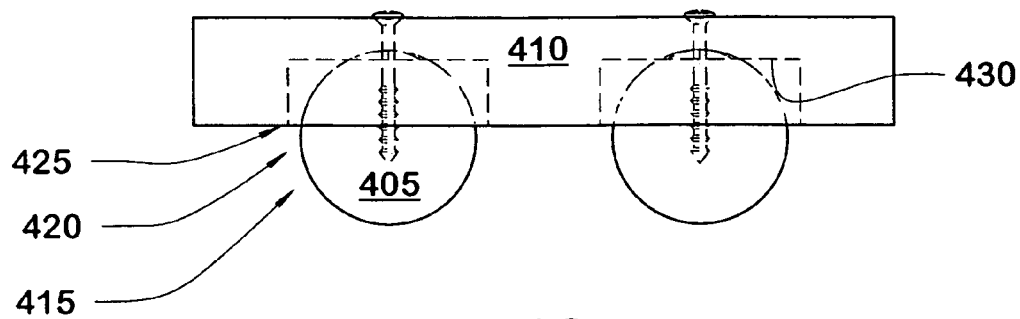

Referring to FIGS. 5 and 6, a further embodiment configured according to principles of the invention is a jetter cup holder 400 that includes a plurality of pegs 405, each configured to receive a jetter cup (not shown), mounted on a plate 410. As with peg 105, peg 405 has a similar lower portion 415, central portion 420 and upper portion 425.

Jetter cup holder 400 has a like number of recesses 430 as pegs 405. Preferably, each recess 430 is cylindrically or otherwise shaped to receive and protect cups (not shown) mounted on pegs 405 from contaminating fluid when stored and cleaned.

The invention is not limited to the particular embodiments described and depicted herein, rather only to the following claims.

I claim:

1. Apparatus for holding a jetter cup having an opening, comprising:
    a plate; and
    a peg fixed relative to said plate, said peg having a first portion, a second portion and a third portion;
    wherein said third portion is:
        interposed between and larger than said first portion and said second portion; and
        larger than the opening.

2. Apparatus of claim 1, wherein one or both of said first portion and said second portion is/are smaller than the opening.

3. Apparatus of claim 1, wherein said peg is generally spherical.

4. Apparatus of claim 1, further comprising a first bead circumscribing said peg.

5. Apparatus of claim 1, further comprising a second peg mounted on said plate, wherein said plate has a recess containing said peg and said second peg.

6. Apparatus of claim 5, wherein said recess is configured to receive a jetter cup.

7. Apparatus of claim 1, wherein said plate and said peg are integral.

8. Apparatus of claim 1, wherein said plate and said peg are fixed with a threaded fastener.

9. Apparatus of claim 1, further comprising a bead circumscribing said plate.

10. Apparatus of claim 1, wherein said plate has a recess containing said peg.

11. Apparatus of claim 10, wherein said recess is configured to receive a jetter cup.

12. Apparatus of claim 10, wherein said recess is cylindrical.

* * * * *